US011927780B2

(12) United States Patent
Lin et al.

(10) Patent No.: US 11,927,780 B2
(45) Date of Patent: Mar. 12, 2024

(54) DIELECTRIC GRATING APPARATUS

(71) Applicant: NATIONAL CHUNG SHAN INSTITUTE OF SCIENCE AND TECHNOLOGY, Taoyuan (TW)

(72) Inventors: Jian-Hung Lin, Taoyuan (TW); Chiang-Hsin Lin, Taoyuan (TW); Po-Tse Tai, Taoyuan (TW); Tsong-Dong Wang, Taoyuan (TW); Bo-Kai Feng, Taoyuan (TW)

(73) Assignee: NATIONAL CHUNG SHAN INSTITUTE OF SCIENCE AND TECHNOLOGY, Taoyuan (TW)

( * ) Notice: Subject to any disclaimer, the term of this patent is extended or adjusted under 35 U.S.C. 154(b) by 0 days.

(21) Appl. No.: 17/828,057

(22) Filed: May 31, 2022

(65) Prior Publication Data
US 2023/0384493 A1 Nov. 30, 2023

(51) Int. Cl.
*G02B 5/28* (2006.01)
*G02B 5/18* (2006.01)

(52) U.S. Cl.
CPC ......... *G02B 5/1809* (2013.01); *G02B 5/1857* (2013.01); *G02B 5/285* (2013.01)

(58) Field of Classification Search
CPC ...................................... G02B 5/285
See application file for complete search history.

(56) References Cited

U.S. PATENT DOCUMENTS

| 5,907,436 | A | 5/1999 | Perry et al. | |
| 7,518,794 | B2 | 4/2009 | Hikichi et al. | |
| 8,165,436 | B2 | 4/2012 | Mossberg et al. | |
| 2006/0152809 | A1* | 7/2006 | Smith | G02B 5/1861 |
| | | | | 359/569 |
| 2015/0109672 | A1* | 4/2015 | Fuchs | G02B 5/1857 |
| | | | | 430/296 |
| 2016/0274283 | A1* | 9/2016 | Ueda | G02B 5/1861 |
| 2017/0363789 | A1* | 12/2017 | Stalder | G02B 1/118 |
| 2019/0204490 | A1* | 7/2019 | Takeda | G02B 7/008 |
| 2020/0064195 | A1* | 2/2020 | Gallinet | G01J 3/1895 |

FOREIGN PATENT DOCUMENTS

CN 102495443 B 4/2015

* cited by examiner

*Primary Examiner* — Jonathan Y Jung

(57) ABSTRACT

A dielectric grating apparatus comprises a substrate; a grating layer, disposed above the substrate; a first interference layer, disposed above the substrate; and a second interference layer, adjacent to the first interference layer, wherein a refractive index of a material of the second interference layer is greater than a refractive index of a material of the first interference layer.

13 Claims, 13 Drawing Sheets

DIELECTRIC GRATING APPARATUS

BACKGROUND OF THE INVENTION

1. Field of the Invention

The present disclosure relates to a grating element, and in particular to a dielectric grating apparatus having high diffraction efficiency and suitable for a wideband spectrum.

2. Description of the Related Art

As a kind of dispersive element, the grating element has different optical characteristics according to the structural design and element material, corresponding to such as different damage threshold, bandwidth in use, reflection efficiency, diffraction efficiency.

One of the grating elements is designed with regard to a design method of a metal dielectric reflective grating [Patent CN 102495443 B (2015)], which uses the metal dielectric grating structure, plating a chrome film, a gold film and a fused quartz film on a fused quartz substrate sequentially, etching a rectangular groove grating on the layer of the fused quartz film, using the bottom metal reflective layer to achieve high reflection diffraction efficiency, the method has the characteristics of clear physical image and simple structure.

In addition to the metal material grating, there is also a multilayer dielectric diffraction grating element [U.S. Pat. No. 5,907,436 (1999)], the patent is the first one to propose a design of a dielectric grating element with high diffraction efficiency, the inventors are Michael D. Perry et al., mainly to disclose a dielectric grating structure fabricated on the multilayer dielectric stack, for a reflective dielectric grating, the application of high reflectivity characteristics of the multilayer dielectric stack can fabricate reflective dielectric grating elements with high diffraction efficiency, conversely, a multilayer dielectric stack with low reflectivity can also be designed, so that the element produces high transmission, and thus, a transmission dielectric grating element with high diffraction efficiency is achieved.

Further, there is also a transmission diffraction grating element [U.S. Pat. No. 7,518,794 B2 (2009)], which proposes a transmissive diffraction grating element independent of polarization, in which the top of the high refractive index dielectric grating layer is added with a low refractive index dielectric grating layer, and a multilayer dielectric stack is used between the grating layer and the substrate, this design is mainly to achieve a transmissive diffraction grating element that is independent of polarization and has a high diffraction rate.

Further, there is also a high diffraction efficiency grating element with a design of a reduced thickness and matching layers [U.S. Pat. No. 8,165,436 B2 (2012)], the used grating layer is a sandwich structure, composed of three different refractive index silicon compounds, arranged with from air to the surface of the grating layer: $SiO_2$, SiN, and $SiO_xN_y$, corresponding to the refractive indexes of 1.45, 2.2, and 1.7, respectively, by the other two high refractive index matching layers (SiN and $SiO_xN_y$), the purpose of reducing the thickness of the grating layer is achieved, and high diffraction efficiency and characteristics independent of polarization are obtained.

BRIEF SUMMARY OF THE INVENTION

As can be seen from the above, although the metal dielectric reflective grating can achieve high reflection diffraction efficiency, because the damage threshold of the metal is lower than that of the dielectric layer, the metal grating element can generally only be applied to a lower power optical system, which is not conducive to the application of high-power laser optical systems. Although the replacement of the metal reflective layer by the multilayer dielectric layer structure can make the diffracted element have higher damage threshold and diffraction efficiency, it increases the design complexity and manufacturing difficulty of the dielectric grating element for the application of a single polarization transmission diffraction element. The structural design using too many different material layers is relatively difficult for the actual production and process of dielectric grating elements, e.g., etching more than three different materials is relatively difficult. In this regard, the present disclosure discloses a relatively simple structure, low difficulty in production, suitable for use in high-power lasers, and has high diffraction efficiency and is suitable for a dielectric grating apparatus with a wideband spectrum.

Accordingly, the present disclosure provides a dielectric grating apparatus comprising a substrate; a grating layer, disposed above the substrate; a first interference layer, disposed above the substrate; and a second interference layer, adjacent to the first interference layer, wherein a refractive index of a material of the second interference layer is greater than a refractive index of a material of the first interference layer.

As the above-described dielectric grating apparatus, a material of the grating layer is $SiO_2$.

As the above-described dielectric grating apparatus, the first interference layer is located at the bottom of the grating layer, and the first interference layer is the same material as the grating layer.

As the above-described dielectric grating apparatus, the material of the first interference layer is $SiO_2$.

As the above-described dielectric grating apparatus, the material of the second interference layer is an optical coating material.

As the above-described dielectric grating apparatus, the optical coating material of the second interference layer comprises SiN, $Ta_2O_5$, $HfO_2$ or any combination thereof.

As the above-described dielectric grating apparatus, the refractive index of the material of the second interference layer is greater than a refractive index of the material of the grating layer.

As the above-described dielectric grating apparatus, a material of the substrate is an optical material.

As the above-described dielectric grating apparatus, the optical material of the substrate comprises $SiO_2$, sapphire or any combination thereof.

As the above-described dielectric grating apparatus, the grating layer has a period range of 300 nm to 1000 nm, a thickness of 100 nm to 2000 nm, and a width of 50 nm to 500 nm.

As the above-described dielectric grating apparatus, a thickness of the first interference layer is 50 nm to 500 nm.

As the above-described dielectric grating apparatus, a thickness of the second interference layer is 50 nm to 1000 nm.

As the above-described dielectric grating apparatus, a thickness of the substrate is 1 mm to 3 mm.

As the above-described dielectric grating apparatus, the first interference layer and the second interference layer are disposed in the grating layer.

The present disclosure adds a pair of first interference layer and second interference layer with high and low refractive indexes between the grating layer and the substrate to achieve the physical mechanism of destructive interference of reflected light, inhibit natural reflection, thereby achieving the purpose of high diffraction efficiency and a wideband spectrum. Further, because the dielectric grating apparatus of the present disclosure has a relatively simple structure, subsequent production is more easily, it has the effects of reducing the difficulty of the process and manufacturing costs.

DETAILED DESCRIPTION OF THE INVENTION

In order to describe the technical content and the construction features of the present disclosure in detail, embodiments together with the attached drawings for the further description of the present disclosure are provided as below.

The disclosure proposes a dielectric grating apparatus, by adding a pair of first interference layer and second interference layer with high and low refractive indexes between the grating layer and the substrate, the physical mechanism of destructive interference of reflected light is achieved to inhibit natural reflection, thereby achieving the purposes of high diffraction efficiency and a wideband spectrum.

In an embodiment of the disclosure, by further using a genetic algorithm for element structure optimization, the suitable thicknesses of the first interference layer and the second interference layer with different refractive indexes are calculated, in order to reduce the loss caused by natural reflection, thereby improving the diffraction efficiency of the dielectric grating apparatus, wherein calculation results of an embodiment of the present disclosure for a wavelength range of 950-990 nm have the diffraction efficiencies greater than 98%. Because the dielectric grating apparatus of an embodiment of the present disclosure has a relatively simple structure, subsequent production is more easily. The dielectric grating apparatus can also be applied to a dispersive element of the multibeam spectra beam combination in high-power optical fiber laser systems or high-power semiconductor laser systems.

Figure 1:
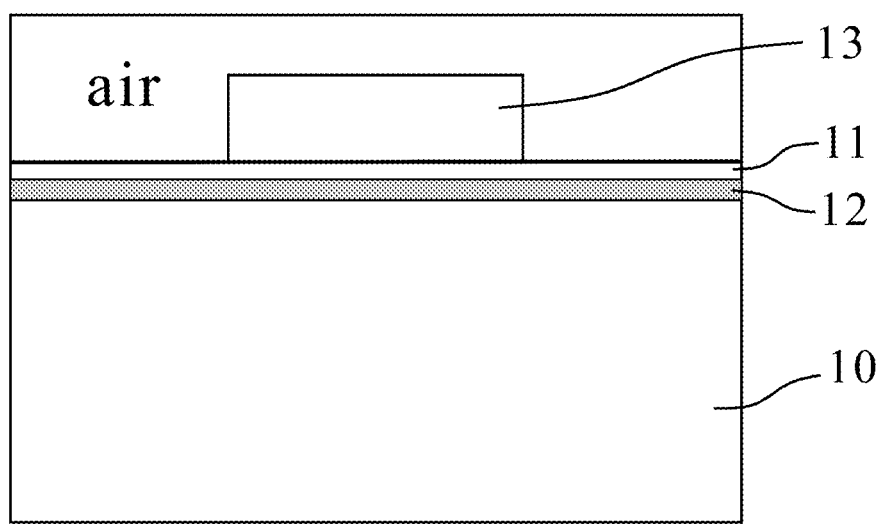
FIG. 1 shows a dielectric grating apparatus in an embodiment of the present disclosure.

FIG. 1 shows a dielectric grating element in an embodiment of the present disclosure, consisting of a substrate 10, a grating layer 13 disposed above the substrate, a first interference layer 11 disposed above the substrate, and a second interference layer 12 adjacent to the first interference layer 11, wherein a refractive index of a material of the second interference layer 12 is greater than a refractive index of a material of the first interference layer 11. By adding a pair of first interference layer and second interference layer with high and low refractive indexes between the grating layer and the substrate, the physical mechanism of destructive interference of reflected light is achieved to inhibit natural reflection, thereby achieving the effects of high diffraction efficiency and a wideband spectrum. In an embodiment, the grating layer 13 and the first interference layer 11 are both low refractive index dielectric materials, e.g., $SiO_2$. In an embodiment, the first interference layer 11 is located below the grating layer 13 and is the same material as the grating layer 13, although the thickness of the first interference layer 11 is thin, it is also one of the key factors affecting the diffraction efficiency. In an embodiment, the material of the second interference layer 12 is an optical coating material, the material may generally be SiN, $Ta_2O_5$ or $HfO_2$, in an embodiment of the present disclosure, the grating layer 13 and the first interference layer 11 are selected from $SiO_2$, the refractive index is about 1.45@970 nm, and the second interference layer 12 is selected from $HfO_2$, the refractive index is about 1.96@970 nm. By adding a pair of the first interference layer 11 and the second interference layer 12 with high and low refractive indexes between the grating layer 13 and the substrate 10, the destructive interference of reflected light is achieved to facilitate reducing natural reflection, thereby achieving the purposes of high diffraction efficiency and a wideband spectrum.

Figure 2:
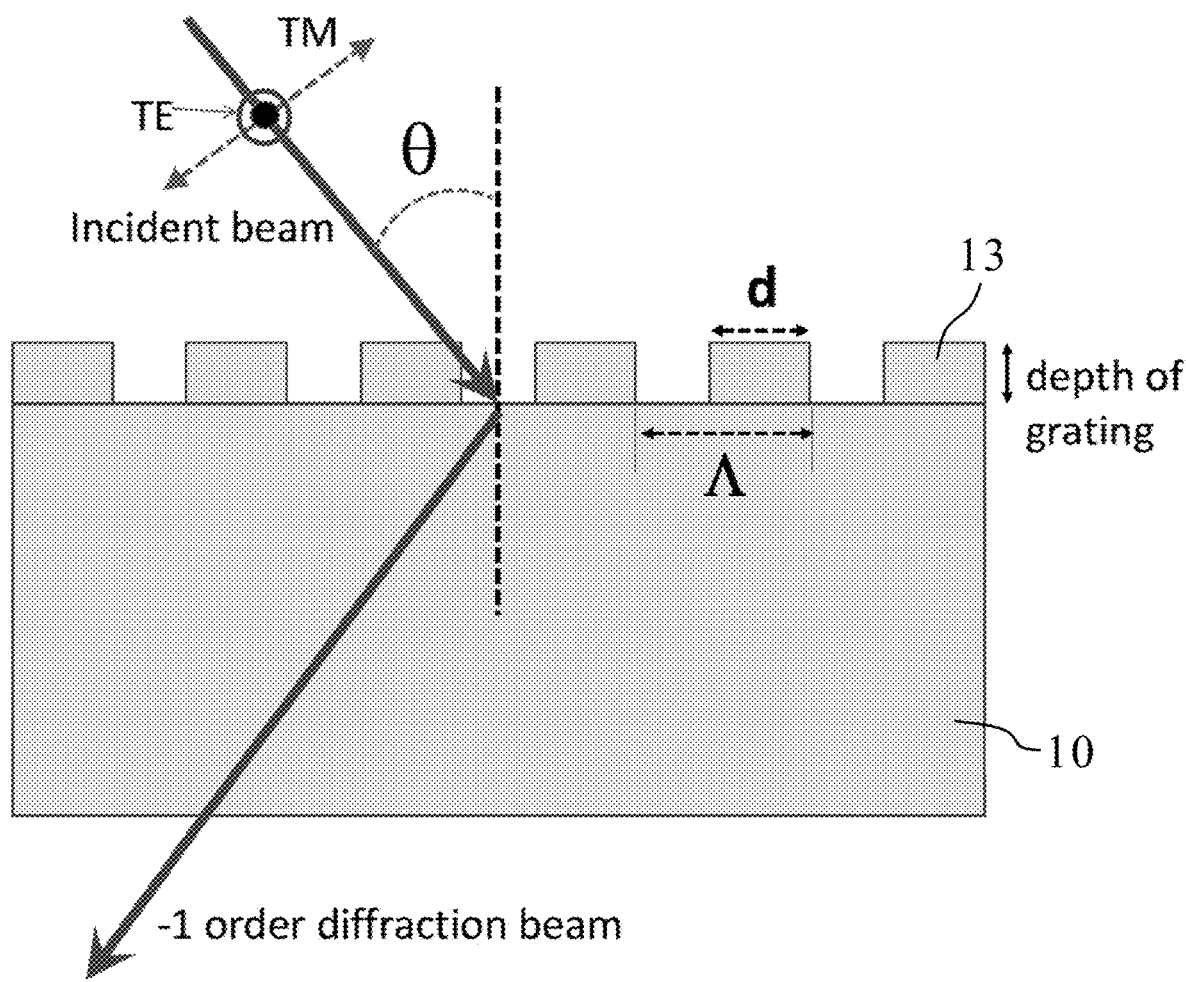
FIG. 2 shows a schematic view of a design of a transmission dielectric grating element in an embodiment of the present disclosure.

FIG. 2 shows a schematic view of a design of a transmission dielectric grating element in an embodiment of the present disclosure. In the specification design of the dielectric grating apparatus, an embodiment of the present disclosure uses a rigorous couple wave analysis method (RCWA), which has very good computational efficiency and accuracy for analyzing the optical diffraction element having a periodic structure. In part of the element parameter optimization, a genetic algorithm is applied to find the optimal element structure parameters. In the design of the transmission dielectric grating dispersive element, it is mainly to design a −1 order transmission dielectric grating dispersive element with high diffraction efficiency and a wideband spectrum, which also plays an important role in the semiconductor laser multibeam spectra beam combination technology.

As shown in FIG. 2, the grating layer 13 structure is fabricated on a surface of the $SiO_2$ substrate, the relevant parameters of the grating structure comprise: grating period (Λ), etching depth (depth of grating), width (d) and filling ratio, which is defined as (d/Λ). In an embodiment of the present disclosure, when the genetic algorithm is used to calculate the optimal parameters of the dielectric grating element, the grating period (Λ) is set to 625 nm, there are mainly two grating structural parameters involved in the operation, respectively, etching depth (depth of grating), filling ratio, in the calculation of a bi-layer dielectric grating structure design of an embodiment of the present disclosure, the parameters of the thickness of the first interference layer and the thickness of the second interference layer will be further added, i.e., $SiO_2$ interference layer thickness and $HfO_2$ layer thickness in an embodiment. Further, in addition to calculating a single grating layer structure, the results of the bi-layer layer dielectric grating structure further adding a pair of interference layers with high and low refractive indexes are also calculated, the calculation results of the diffraction efficiency of both are significantly worse than the design of the bi-layer dielectric grating structure of an embodiment of the present disclosure, the results will be described in detail later. The metric function is set as Equation (1):

$$\Sigma(3-(de_{950}+de_{970}+de_{990})) \qquad (1)$$

It is mainly to calculate by adding up −1 order transmission diffraction efficiency (de950, de970, de990) of three wavelengths such as (950 nm, 970 nm, 990 nm) and subtracting from three, when the minimum value is obtained, it is the optimal solution.

Figures 3A, 3B, 3C:
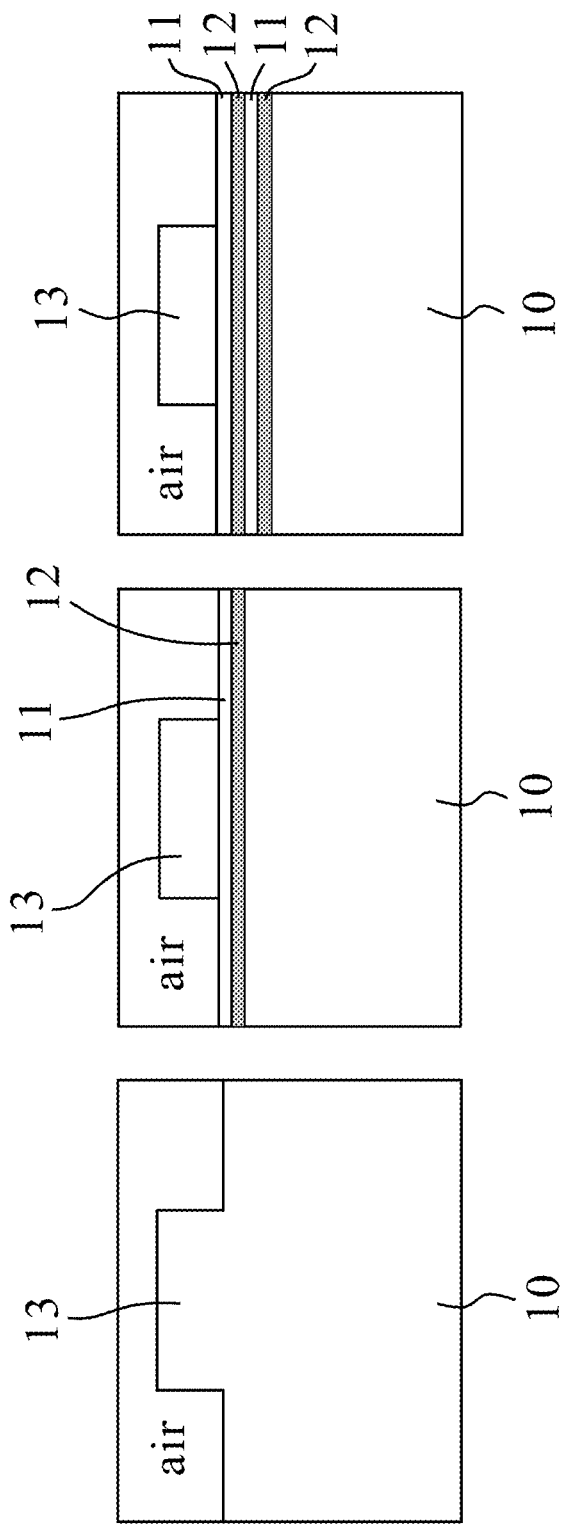
FIG. 3A shows a single grating structure design.
FIG. 3B shows a bi-layer dielectric grating structure design in an embodiment of the present disclosure.
FIG. 3C shows a multilayer dielectric grating structure design in an embodiment of the present disclosure.

FIG. 3A shows a single grating structure design, FIG. 3B shows a bi-layer dielectric grating structure design in an embodiment of the present disclosure, FIG. 3C shows a multilayer dielectric grating structure design in an embodiment of the present disclosure. In terms of transmission grating dispersive elements, the best material of the substrate 10 is fused silica, which has low absorption characteristics for wavelengths greater than 800 nm, conducive to the application of high-power lasers, of which Corning 7980 and Corning 7979 are the most preferred. FIG. 3A shows a single grating structure design, directly fabricating a grating structure on the fused silica substrate 10; FIG. 3B shows a bi-layer dielectric grating structure design in an embodiment of the present disclosure, a second interference layer 12 is first plated on the fused silica substrate 10, the material is a high refractive index dielectric material in an embodiment, it may generally use $Ta_2O_5$ or $HfO_2$, the reason for the selection of $HfO_2$ compared to $Ta_2O_5$ is that the former has a higher damage threshold, followed by the first interference layer 11 and the grating layer 13, the materials of both the first interference layer 11 and the grating layer 13 are $SiO_2$ in an embodiment; FIG. 3C shows a multilayer dielectric grating structure design in an embodiment of the present disclosure, which is further adding a pair of the first interference layer 11 and the second interference layer 12 with high and low refractive indexes below the grating layer 13 of the bi-layer dielectric grating structure, the materials are $SiO_2$ with a lower refractive index and $HfO_2$ with a higher refractive index in an embodiment.

Figure 4:
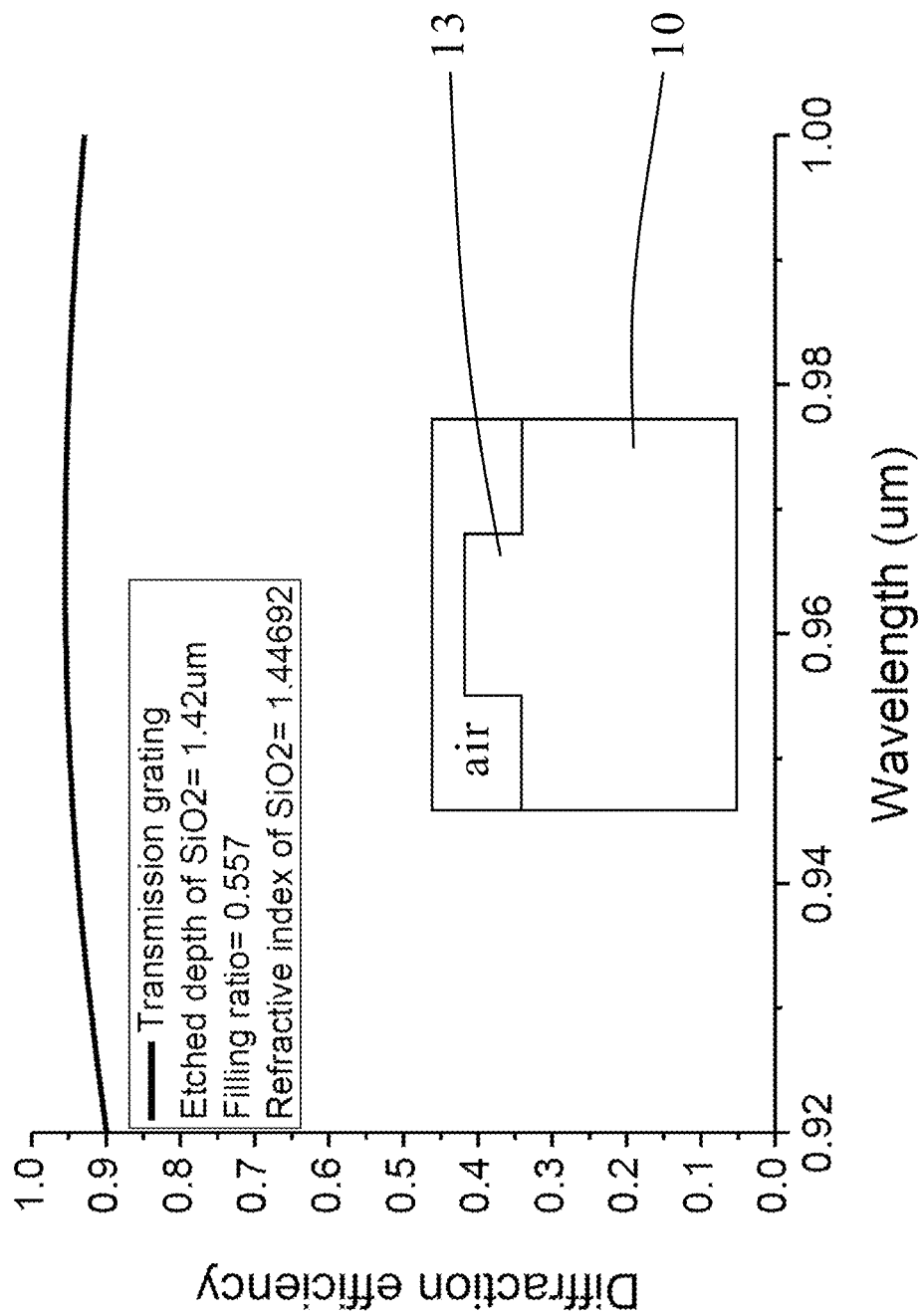
FIG. 4 shows calculation results of diffraction spectrum of a single grating structure design in an embodiment of the disclosure.

FIG. 4 shows calculation results of diffraction spectrum of a single grating structure design in an embodiment of the disclosure, which are the optimal solutions obtained by using a genetic algorithm. The optimal solutions of the genetic algorithm are in the range of 920 nm-1000 nm, all the −1 order transmission diffraction efficiencies are greater than 90%, the highest diffraction efficiency is 95.3%, and the structural parameters at this time are as follows: the etching depth is 1.42 um, the filling ratio is 0.557, and the result fails to achieve high diffraction efficiency greater than 98%.

Figures 5A, 5B:
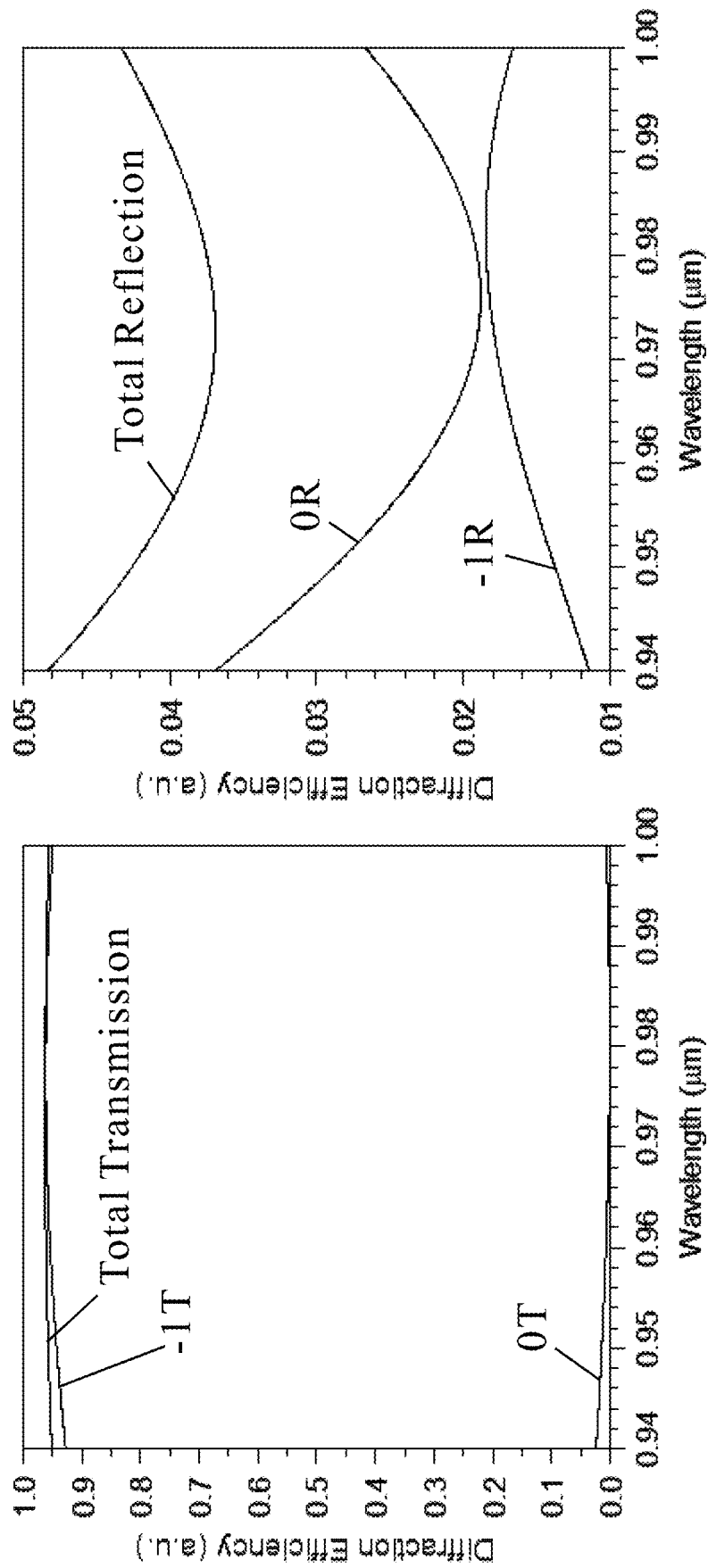
FIG. 5A shows calculation results of a 0 order and −1 order transmission spectra of a single grating structure design in an embodiment of the present disclosure.
FIG. 5B shows calculation results of a 0 order and −1 order reflection spectra of a single grating structure design in an embodiment of the present disclosure.

FIG. 5A shows calculation results of a 0 order and −1 order transmission spectra of a single grating structure design in an embodiment of the present disclosure, FIG. 5B shows calculation results of a 0 order and −1 order reflection spectra of a single grating structure design in an embodiment of the present disclosure. By the calculation results of the 0 order and −1 order transmission and reflection spectra, the causes of light energy loss are discussed, calculating from the transmission spectrum in the range of 940 nm-960 nm, it can be found that some light energy is directly transmitted (0 order transmission); in the range of 960 nm-1000 nm, all the transmission energies are −1 order diffraction, but as can be seen in the reflection spectrum, nearly 4-5% of the energy is mainly transferred by direct reflection (0 order reflection) and −1 order diffraction reflection. In order to reduce the direct reflection (0 order reflection) and −1 order diffraction reflection by 4-5%, the bi-layer dielectric grating design shown in the above-described FIG. 3B is used, through the bi-layer structure, the incident light produces destructive interference in the reflection direction, thereby achieving a very low reflectivity.

Figure 6:
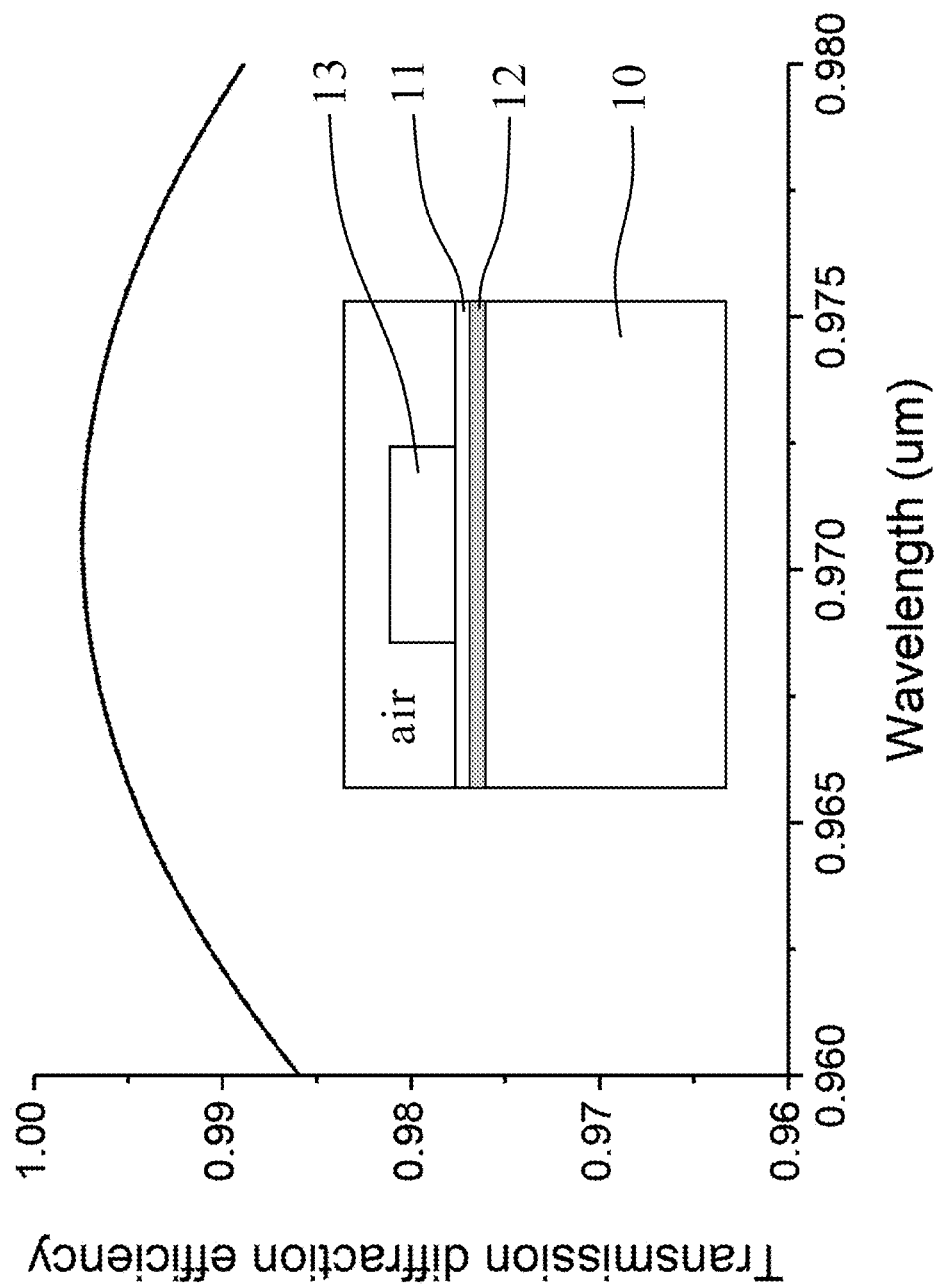
FIG. 6 shows calculation results of the optimized diffraction spectrum of a bi-layer dielectric grating structure design in an embodiment of the present disclosure.

FIG. 6 shows calculation results of the optimized diffraction spectrum of a bi-layer dielectric grating structure design in an embodiment of the present disclosure. The design of the bi-layer dielectric grating structure is mainly adding a pair of the first interference layer 11 and the second interference layer 12 with high and low refractive indexes between the grating layer 13 and the substrate 10 of the single structure, in an embodiment, the material of the first interference layer 11 of the interference layers with the high and low refractive indexes is $SiO_2$ with a low refractive index, the material of the second interference layer 12 is $Ta_2O_5$ or $HfO_2$ with a high refractive index, in the calculation of the present embodiment, the high refractive index material is mainly selected from $HfO_2$, the refractive index is about 1.96@970 nm, there are four structural parameters: etching depth, filling ratio, $SiO_2$ interference layer thickness, and $HfO_2$ interference layer thickness. FIG. 6 is the optimal transmission diffraction spectra obtained by the genetic algorithm, the optimized structural parameters are respectively: etching depth of 1.296 um, filling ratio of 0.409, $SiO_2$ interference layer thickness of 183.7 nm and $HfO_2$ interference layer thickness of 177.9 nm, in the wavelength range of 960-980 nm, the average value of transmission −1 order diffraction efficiency is 99.4%, having the result of high diffraction efficiency and a wideband spectrum optical characteristics.

Figure 7:
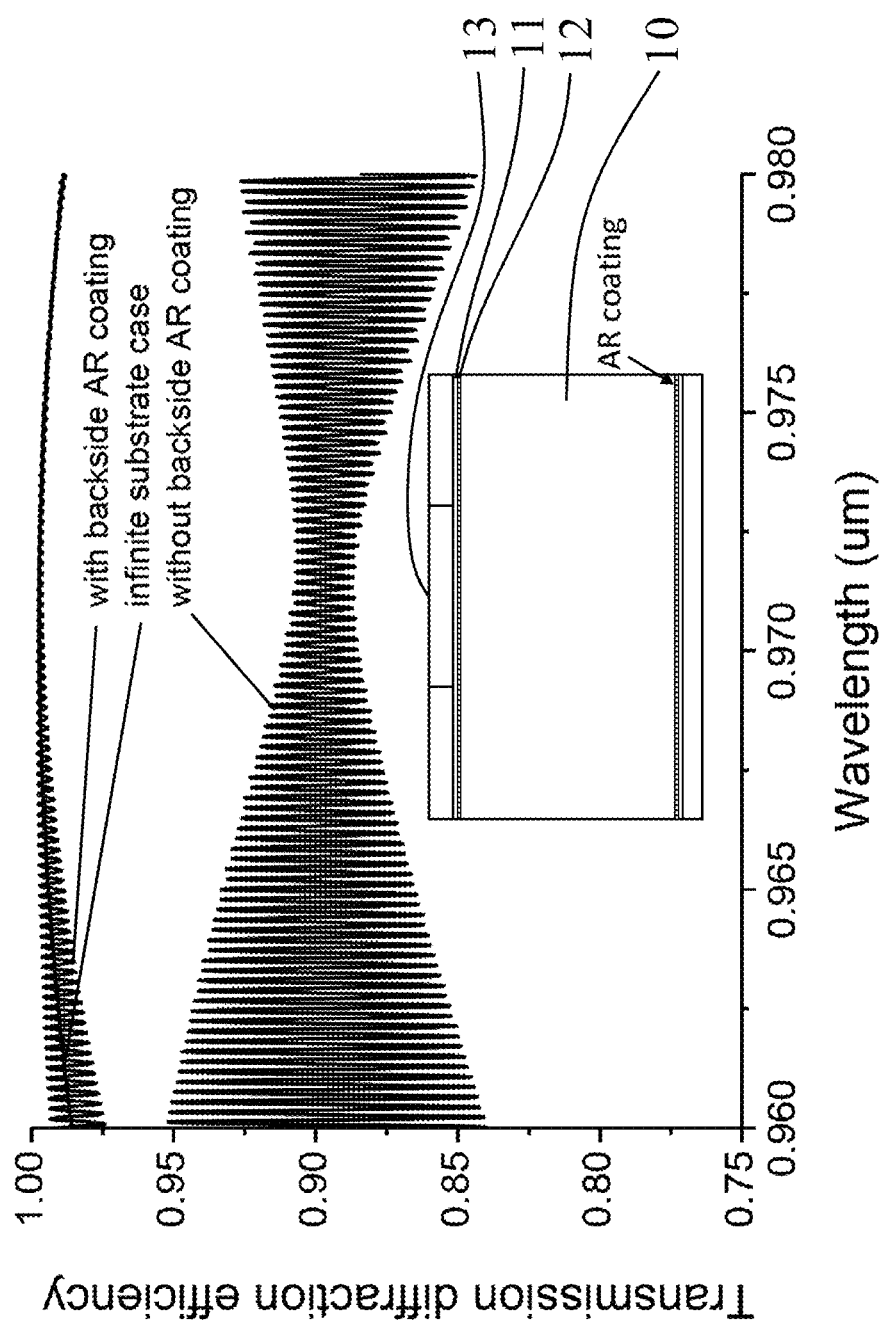
FIG. 7 shows calculation results of the diffraction spectra of a bi-layer dielectric grating element with/without a backside anti-reflective coating on the substrate in an embodiment of the present disclosure.

FIG. 7 shows calculation results of the diffraction spectra of a bi-layer dielectric grating element with/without a backside anti-reflective coating on the substrate in an embodiment of the present disclosure. Commercially available transmission diffraction grating elements are generally plated with an anti-reflective coating on the backside of the substrate, the most commonly used technology is V-coating with two layers of high and low refractive index dielectric materials, in order to reduce the natural reflection of diffracted light on the backside of the substrate 10. For the wavelength range of 950-990 nm and the incident angle of 51.3 degrees, the optimized V-coating: $HfO_2$ thickness is 185.3 nm and $SiO_2$ thickness is 166.1 nm. FIG. 7 is calculation results of the bi-layer dielectric grating structure with a backside anti-reflective coating on the substrate and without a backside anti-reflective coating on the substrate, the thickness of the substrate 10 is 1 mm, in the search for structural optimization conditions, an infinite substrate thickness (infinite substrate case) will be generally used to increase the calculation speed; under the calculation of finite substrate thickness conditions, because the partial reflection and Fabry-Perot interference will occur at light traveling to the backside of the substrate 10, the average diffraction efficiency is about 90% under the condition of without plating anti-reflective coating; the result of with backside AR coating on the substrate can effectively inhibit the reflection on the back of the substrate 10, although there is also an obvious Fabry-Perot interference phenomenon, the average diffraction efficiency can still be maintained at 99.3%, which is less than 0.1% different from the infinite substrate thickness calculation.

Figure 8:
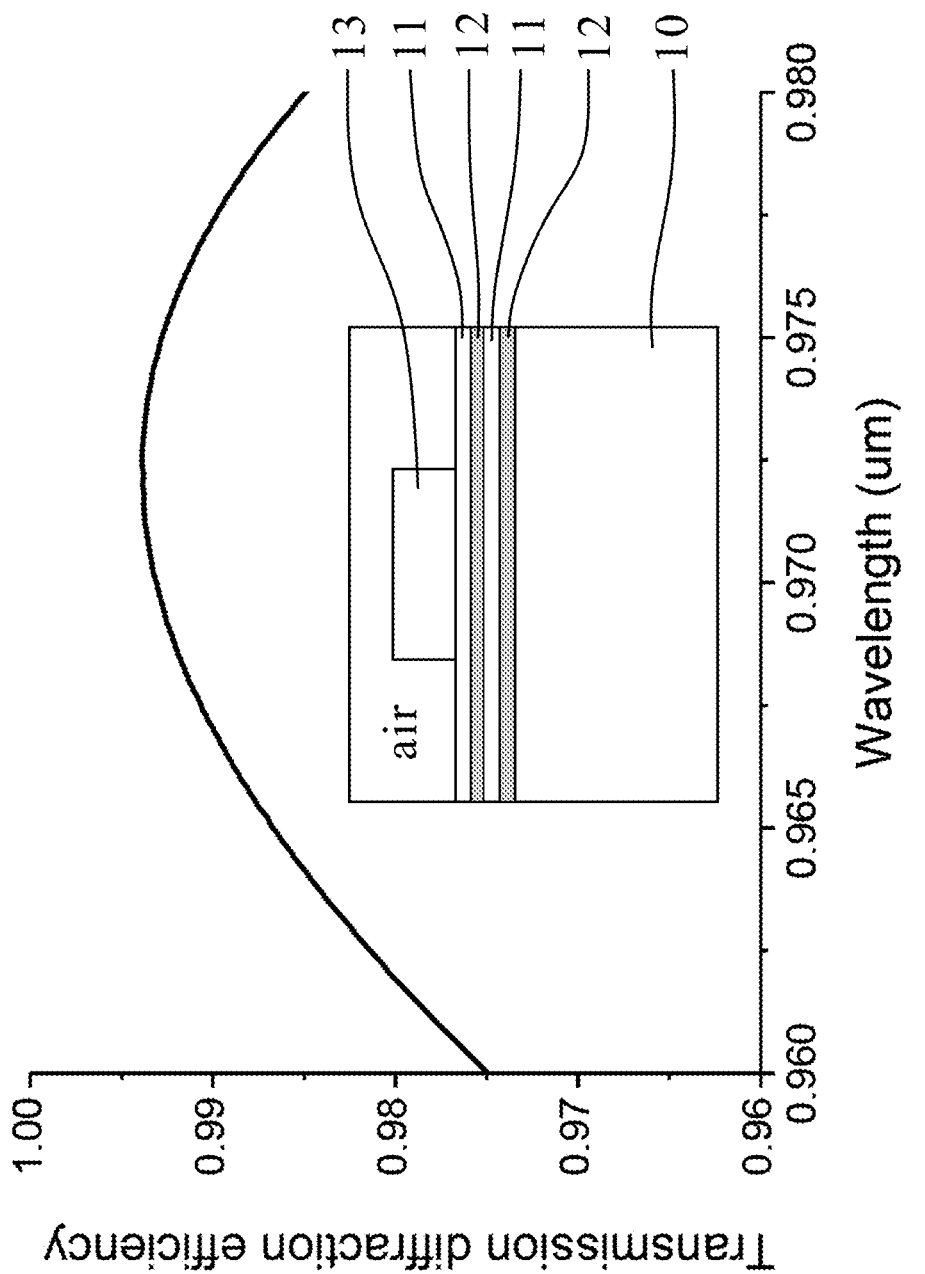
FIG. 8 shows calculation results of the diffraction spectrum of a multilayer dielectric grating structure in an embodiment of the present disclosure.

FIG. 8 shows calculation results of the diffraction spectrum of a multilayer dielectric grating structure in an embodiment of the present disclosure. In a multilayer dielectric grating structure design of an embodiment of the present disclosure, it is mainly adding a pair of high/low refractive index layers $HfO_2/SiO_2$ between the substrate 10 and the second interference layer 12 with a higher refractive index (in an embodiment, that is, $HfO_2$ layer) of the bi-layer dielectric grating structure, structural parameters are increased to six items: etching depth, filling ratio, an original $SiO_2$ interference layer thickness, an original $HfO_2$ layer thickness, and new $HfO_2/SiO_2$ layers thicknesses. FIG. 8 is the optimal transmission diffraction spectra obtained by the genetic algorithm, the optimized structural parameters are respectively: etching depth of 1.366 um, filling ratio of 0.333, the $SiO_2$ interference layer thickness of 167.3 nm, the $HfO_2$ interference layer thickness of 83.3 nm, and the $HfO_2$ layer with a high refractive index/the $SiO_2$ layer with a low refractive index thicknesses are respectively 177.9 nm/351.2 nm, in the wavelength range of 960-980 nm, the average value of transmission −1 order diffraction efficiency is 98.9%, although this result can also obtain high diffraction efficiency, the result is lower than a bi-layer dielectric grating structure in an embodiment of the present disclosure.

Figure 9:
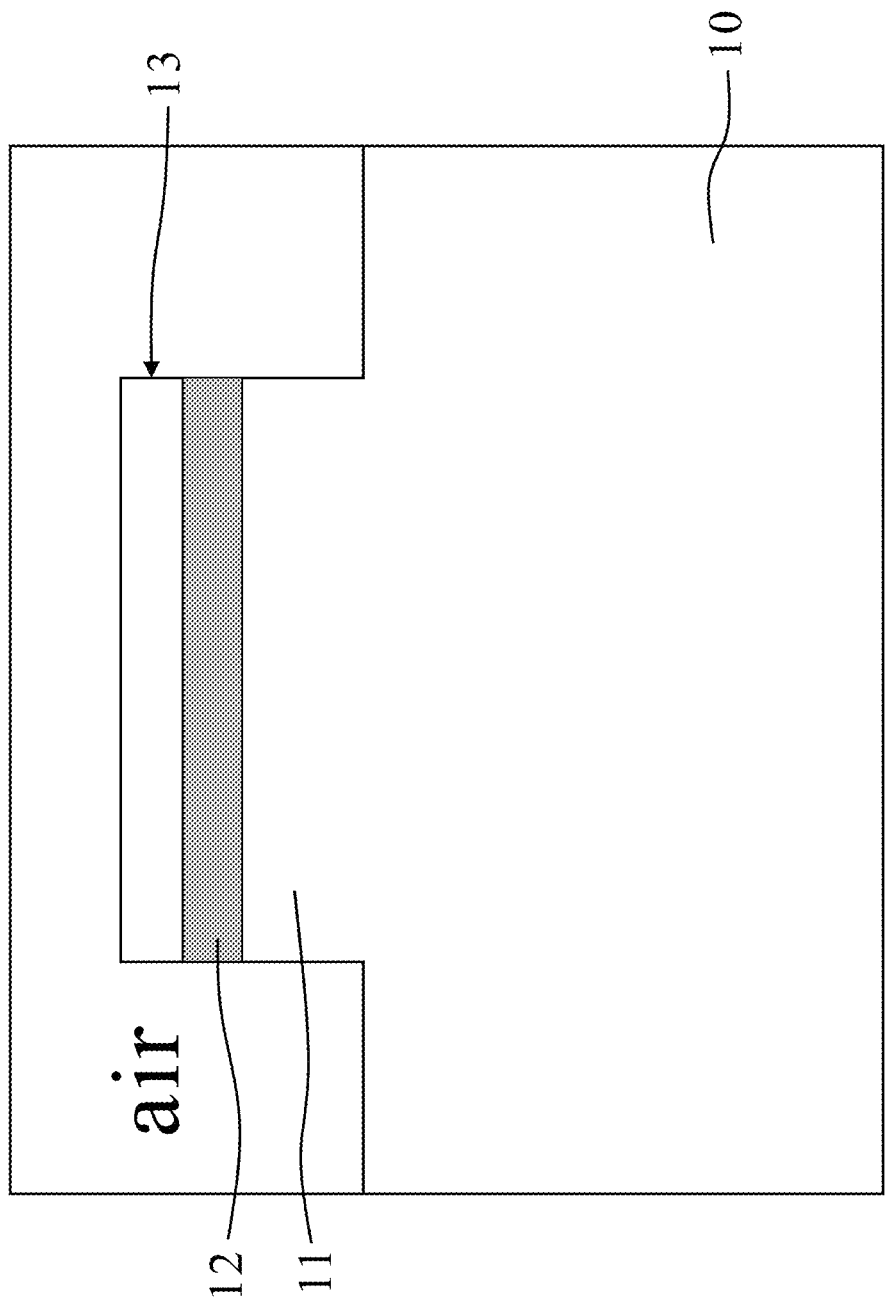
FIG. 9 shows a composite dielectric grating element in an embodiment of the present disclosure.

FIG. 9 shows a composite dielectric grating element in an embodiment of the present disclosure. By disposing the first interference layer 11 and the second interference layer 12 in the grating layer 13, the grating layer 13 itself is mainly composed of a first interference layer 11 with a lower refractive index material and a second interference layer 12 with a higher refractive index material. In an embodiment, the material of the first interference layer 11 is $SiO_2$, the material of the second interference layer 12 is $HfO_2$. By the composite grating structure design of two different refractive index materials, because of the high refractive index of $HfO_2$, the etching depth required for high diffraction efficiency can be reduced, in addition, the combination of high and low refractive index materials is similar to the principle of the anti-reflective coating, in addition to the chance to obtain higher diffraction efficiency, there is also a chance to obtain a wider use spectrum.

Figure 10:
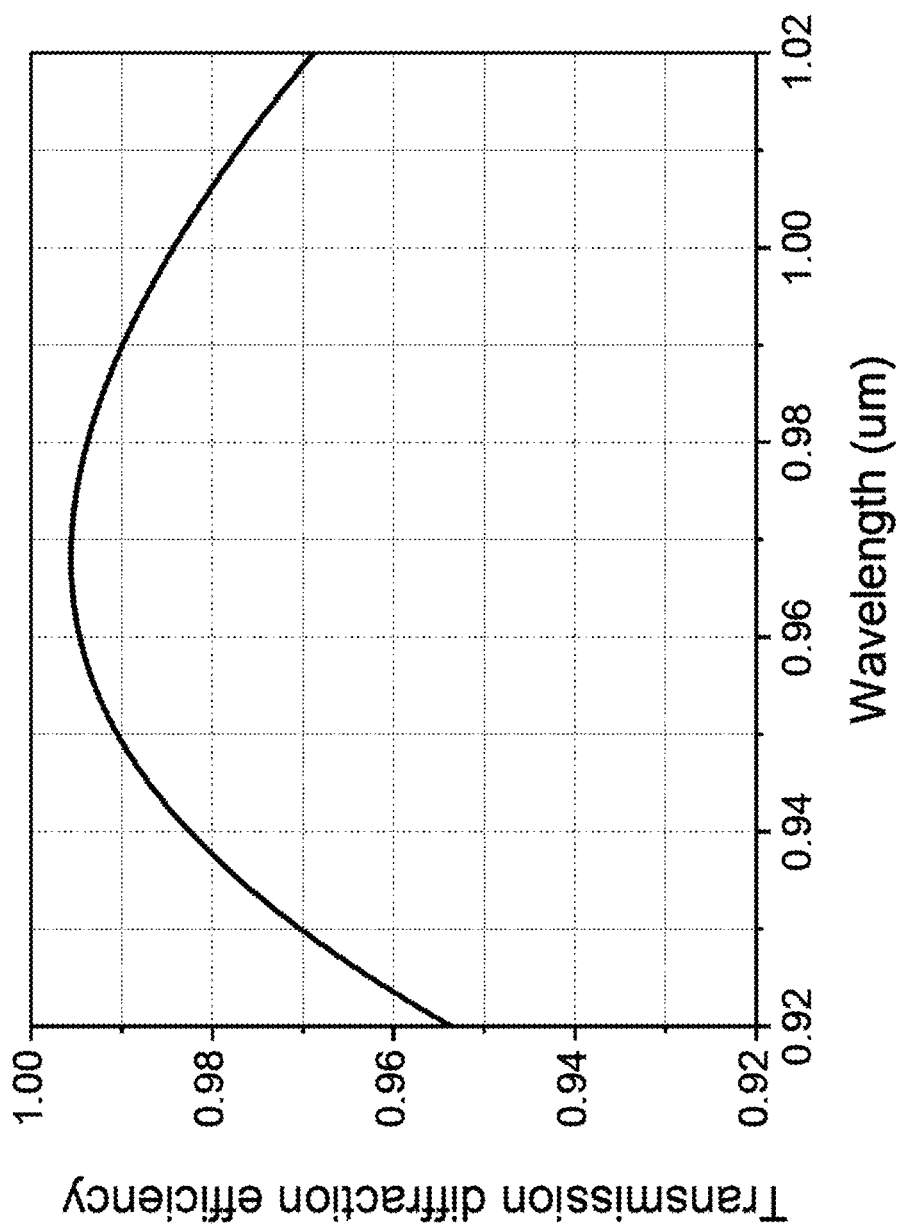
FIG. 10 shows calculation results of transmission spectrum of a composite dielectric grating element in an embodiment of the present disclosure.

FIG. 10 shows calculation results of transmission spectrum of a composite dielectric grating element in an embodiment of the present disclosure, the calculation results of the transmission spectrum of the composite grating dispersive element design with the high and low refractive index materials are one of the optimal structural solutions obtained by using the genetic algorithm in an embodiment of the present disclosure, the relevant parameters are as follows: etching depths of $SiO_2/HfO_2/SiO_2$ sandwich are respectively 287.5 nm/337.6 nm/578.6 nm, filling ratio of 0.545, in the wavelength range of 920-1020 nm, all the transmission −1 order diffraction efficiencies are greater than 95%, it can achieve 100 nm wideband spectrum design; for diffraction efficiency of 98% or more, the wavelength range is between 940-1000 nm; in the range of 950-990 nm required, the average value of transmission −1 order diffraction efficiency is 99.4%, which meets the purpose of high diffraction efficiency.

Figures 11A, 11B:
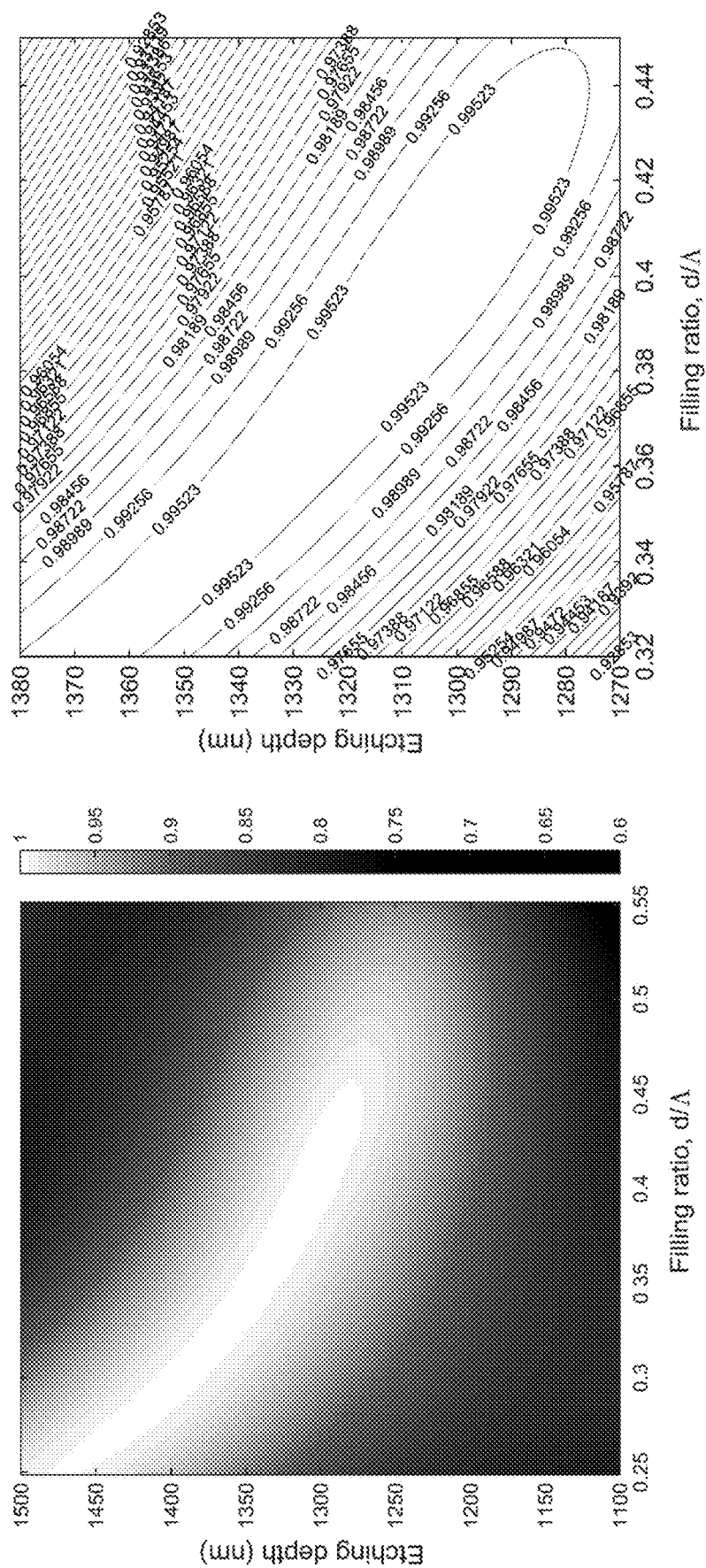
FIG. 11A shows an imaging graph of the etching depth and the grating layer filling ratio of structure manufacturing parameters of the dielectric grating element in an embodiment of the present disclosure, the brighter the color is, the higher the diffraction efficiency is.
FIG. 11B shows a detailed contour plot of FIG. 11A.

FIG. 11A shows an imaging graph of the etching depth and the grating layer filling ratio of structure manufacturing parameters of the dielectric grating element in an embodiment of the present disclosure, the brighter the color is, the higher the diffraction efficiency is. FIG. 11B shows a detailed contour plot of FIG. 11A. In an embodiment of the present disclosure, in the dielectric grating apparatus in which a pair of first interference layer and second interference layer with high and low refractive indexes are disposed between the substrate and the grating layer, in the case of structural optimization parameters found by the genetic algorithm, the wavelength range is 960 nm to 980 nm, the incident angle is set to 50.895 degrees @Littrow 970 nm, all the diffraction efficiencies are greater than 98%. Next, the manufacturing tolerance analysis of each structural parameter at the time of manufacture is discussed, FIG. 11A is an imaging graph of the etching depth and the grating layer filling ratio, the brighter the color is, the higher the diffraction efficiency is, FIG. 11B is a detailed contour plot, the high diffraction efficiency presents the result that the filling ratio is inversely proportional to the etching depth, when the filling ratio is small, a deep etching depth is required, where the physical reason is that the difference between the ground waveguide mode and the −1 order waveguide mode is a constant value, and the equivalent refractive index must be a constant value.

Figure 12:
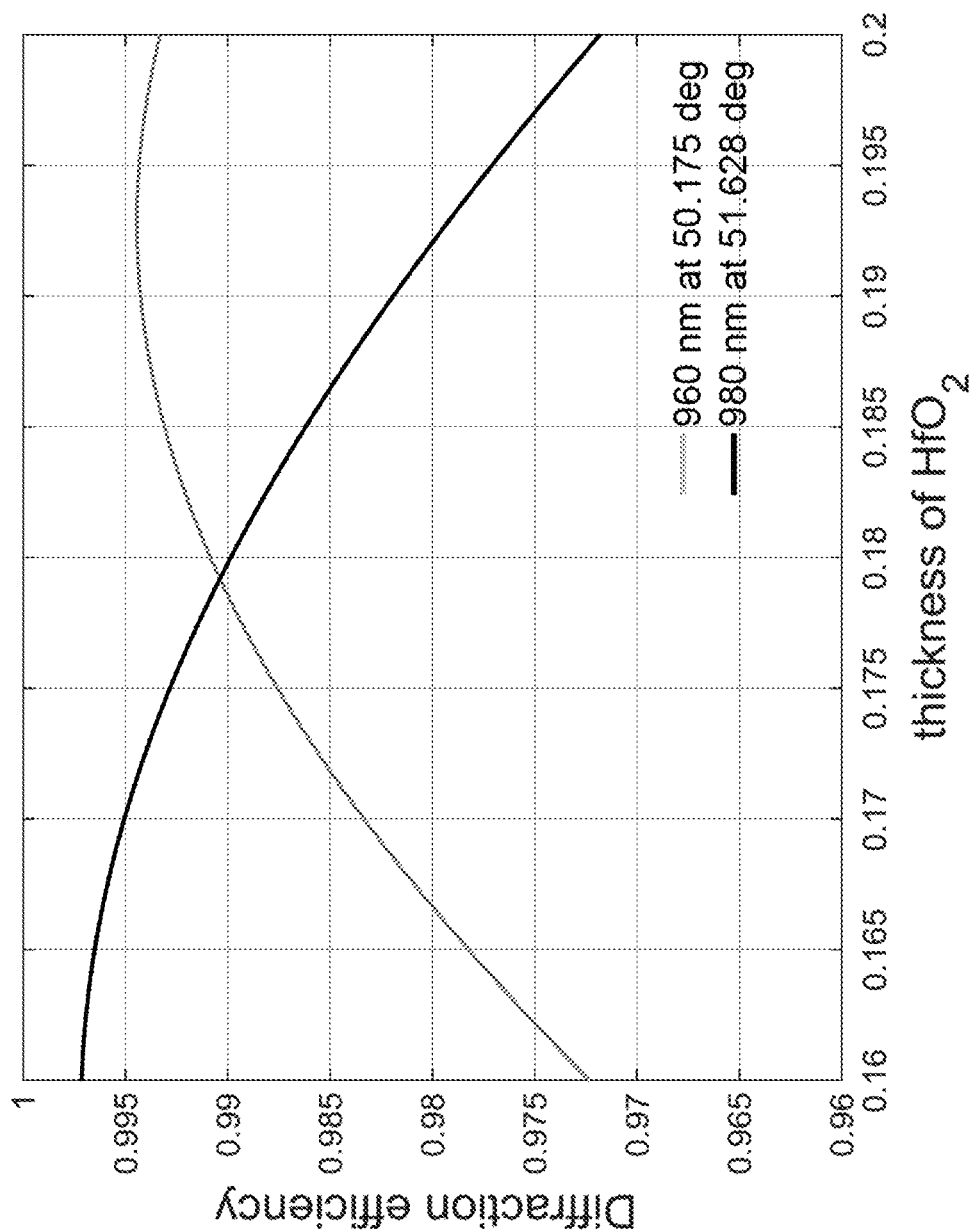
FIG. 12 shows calculation results of the effect of the thickness of the high refractive index interference layer on the diffraction efficiency of the dielectric grating element in an embodiment of the present disclosure.

FIG. 12 shows calculation results of the effect of the thickness of the high refractive index interference layer on the diffraction efficiency of the dielectric grating element in an embodiment of the present disclosure. Next, the effect of the thickness of the second interference layer on the diffraction efficiency is discussed, the material is $HfO_2$ in an embodiment. By fixing the optimal etching depth of 1.296 um, filling ratio of 0.409, and $SiO_2$ interference layer thickness of 183.7 nm, different $HfO_2$ thicknesses are calculated, and in semiconductor laser multibeam spectra couple applications, the minimal incident wavelength is 960 nm, the corresponding incident angle is 50.175 degrees, the maximal incident wavelength is 980 nm, and the corresponding incident angle is 51.628 degrees, so the $HfO_2$ thickness range covered by the upper limit and lower limit application wavelengths is calculated, that is, the manufacturing tolerance of the $HfO_2$ layer that can be tolerated at fabricating the dielectric grating apparatus, if the diffraction efficiency is set to 98%, the $HfO_2$ tolerance range is 0.166 um to 0.192 um.

Figure 13:
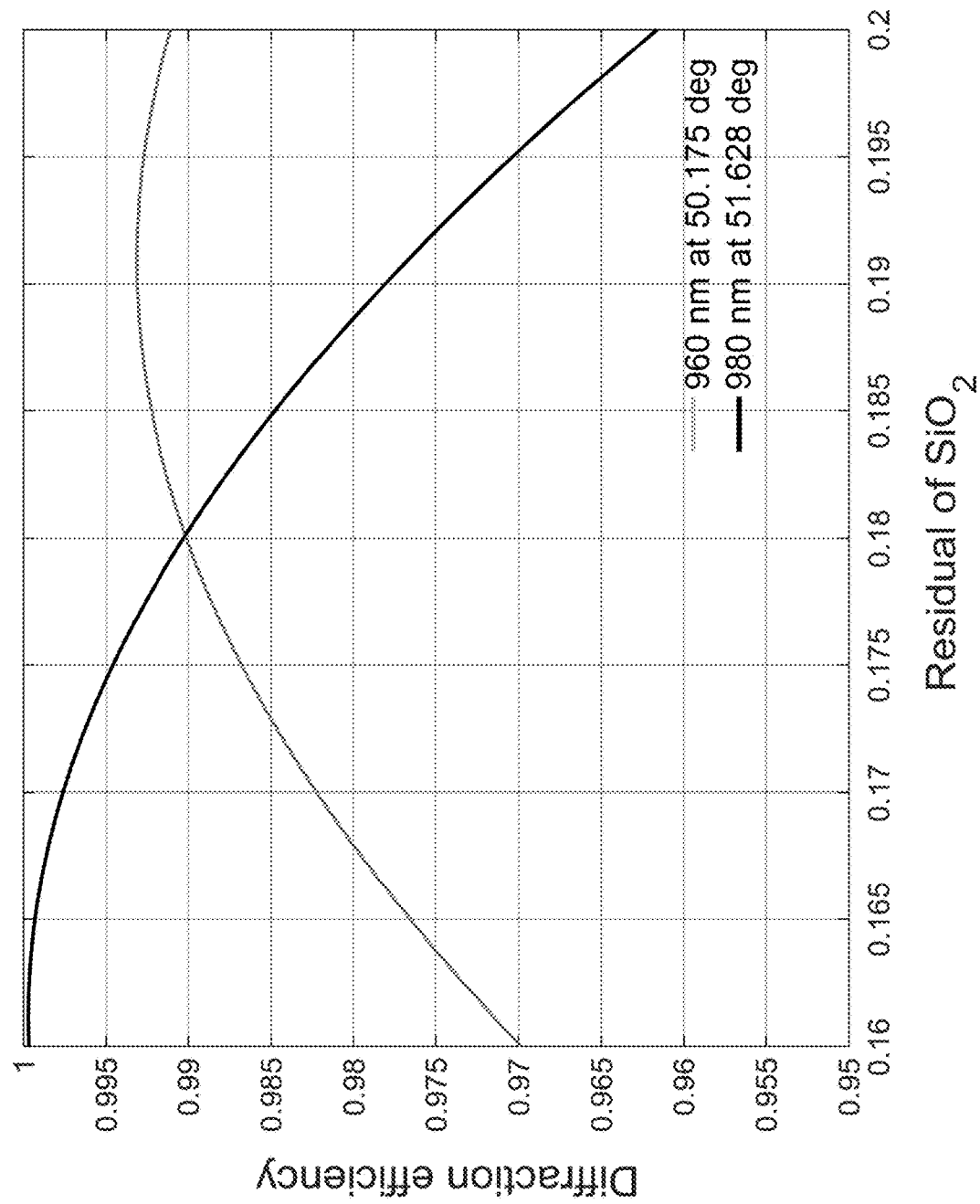
FIG. 13 shows calculation results of the effect of the thickness of the low refractive index interference layer on the diffraction efficiency of the dielectric grating element in an embodiment of the present disclosure.

FIG. 13 shows calculation results of the effect of the thickness of the low refractive index interference layer on the diffraction efficiency of the dielectric grating element in an embodiment of the present disclosure. Next, the effect of the thickness of the first interference layer on the diffraction efficiency is discussed, the material is $SiO_2$ in an embodiment. By fixing the optimal etching depth of 1.296 um, filling ratio of 0.409, and $HfO_2$ interference layer thickness of 177.9 nm, different $SiO_2$ thicknesses are calculated, and the settings of wavelength and angle are the same as the calculations of the $HfO_2$ thickness tolerance. The diffraction efficiency is set to 98% and the interference $SiO_2$ thickness tolerance range is 0.166 um to 0.188 um.

In the fabrication of the grating apparatus, the width of the grating groove and the etching depth mainly depend on the photoresist thickness, the structure of the photoresist grating, and the etching parameters, while the $SiO_2$ interference layer thickness and the $HfO_2$ interference layer thickness are mainly determined by the optical coating technology used. According to the results of the analysis of the calculation of each tolerance, in an embodiment of the present disclosure, in the dielectric grating apparatus with disposing a pair of first interference layer and second interference layer with high and low refractive indexes between the substrate and the grating layer, the design has high diffraction efficiency and a wideband spectrum and other characteristics, under the condition of optimized structural parameters, it has a higher tolerability for manufacturing tolerances, and the manufacturing tolerances of each structure are: the tolerance of $SiO_2$ grating etching depth is 90 nm, the manufacturing tolerance of filling ratio is 0.12, the manufacturing tolerance of etching groove width after conversion is 75 nm (the grating period is 625 nm) and the manufacturing tolerances of the $SiO_2$ interference layer thickness and the $HfO_2$ interference layer thickness are respectively 22 nm and 26 nm.

As disclosed by embodiments of the present disclosure, a dielectric grating element of an embodiment of the present disclosure may withstand a higher damage threshold because it is composed of an all-dielectric material, suitable for applying to high-power laser systems. Further, in an embodiment of the present disclosure, by applying interference layers with high and low refractive indexes, the physical mechanism of destructive interference of reflected light is formed to inhibit the effect of natural reflection, thereby improving the diffraction efficiency, and suitable for a wideband spectral light source, according to the calculation results of the above theory, by adding interference layers with high and low refractive indexes, the application of transmission diffraction elements has a high element performance. It should be noted that for a high-power laser light source, the subtle differences in the diffraction efficiency of individual optical elements will cause great contributions and differences in the final performance of the overall high-power optical system, so it is also crucial to improve the subtle diffraction efficiency of the dielectric grating element, as can be seen from the above, in an embodiment of the present disclosure, the dielectric grating apparatus in which a set of interference layers with high and low refractive indexes is disposed between the substrate and the grating layer has the effect obviously greater than that of the dielectric grating apparatus made by other design methods. In addition, based on a simple element design of an embodiment of the present disclosure, the difficulty of the process of manufacturing element can be greatly reduced, compared to a complex element design, an embodiment of the present disclosure has the effects of high diffraction efficiency and wideband spectrum applications, can further achieve the effect of a significant reduction in the production cost of the grating element.

While the present application has been described by means of specific embodiments, those skilled in the art should understand the above description is merely embodiments of the application, and it should not be considered to limit the scope of the application. It should be noted that all changes and substitutions which come within the meaning and range of equivalency of the embodiments are intended to be embraced in the scope of the application. Therefore, the scope of the application is defined by the claims.

What is claimed is:

1. A dielectric grating apparatus, comprising:
a substrate;
a grating layer, disposed above the substrate;
a first interference layer, disposed above the substrate; and
a second interference layer, disposed above the substrate,
wherein the grating layer is contacted with the first interference layer directly, and the first interference layer is the same material as the grating layer,
wherein a refractive index of a material of the second interference layer is greater than a refractive index of a material of the first interference layer, and
wherein the first interference layer and the second interference layer are disposed in the grating layer.

2. The dielectric grating apparatus according to claim 1, wherein a material of the grating layer is $SiO_2$.

3. The dielectric grating apparatus according to claim 1, wherein the first interference layer is located at the bottom of the grating layer.

4. The dielectric grating apparatus according to claim 1, wherein the material of the first interference layer is $SiO_2$.

5. The dielectric grating apparatus according to claim 1, wherein the material of the second interference layer is an optical coating material.

6. The dielectric grating apparatus according to claim 5, wherein the optical coating material of the second interference layer comprises SiN, $Ta_2O_5$ or $HfO_2$.

7. The dielectric grating apparatus according to claim 1, wherein the refractive index of the material of the second interference layer is greater than a refractive index of the material of the grating layer.

8. The dielectric grating apparatus according to claim 1, wherein a material of the substrate is an optical material.

9. The dielectric grating apparatus according to claim 8, wherein the optical material of the substrate comprises $SiO_2$ or sapphire.

10. The dielectric grating apparatus according to claim 1, wherein the grating layer has a period range of 300 nm to 1000 nm, a thickness of 1000 nm to 1500 nm, and a width of 50 nm to 500 nm.

11. The dielectric grating apparatus according to claim 1, wherein a thickness of the first interference layer is 50 nm to 500 nm.

12. The dielectric grating apparatus according to claim 1, wherein a thickness of the second interference layer is 50 nm to 500 nm.

13. The dielectric grating apparatus according to claim 1, wherein a thickness of the substrate is 1 mm to 3 mm.

\* \* \* \* \*